US012601704B2

(12) United States Patent
Bolger

(10) Patent No.: US 12,601,704 B2
(45) Date of Patent: Apr. 14, 2026

(54) SYSTEM AND METHOD FOR MEASUREMENT OF ION CONCENTRATION IN FLUID SAMPLES

(71) Applicant: Analog Devices International Unlimited Company, Limerick (IE)

(72) Inventor: Eoin Seamus Bolger, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 299 days.

(21) Appl. No.: 18/456,402

(22) Filed: Aug. 25, 2023

(65) Prior Publication Data

US 2025/0067702 A1 Feb. 27, 2025

(51) Int. Cl.
G01N 27/333 (2006.01)

(52) U.S. Cl.
CPC ................................. G01N 27/333 (2013.01)

(58) Field of Classification Search
CPC .......................... G01N 27/333; G01N 27/4163
See application file for complete search history.

(56) References Cited

U.S. PATENT DOCUMENTS

| | | | |
|---|---|---|---|
| 4,448,081 A | 5/1984 | Kolitsch et al. | |
| 10,746,696 B2 | 8/2020 | Yang et al. | |
| 11,313,876 B2 | 4/2022 | Zhang et al. | |

| | | | |
|---|---|---|---|
| 2008/0139951 A1 | 6/2008 | Patangay et al. | |
| 2009/0241659 A1 | 10/2009 | Yoshida et al. | |
| 2018/0259543 A1* | 9/2018 | Gan ...................... | G01N 33/72 |
| 2021/0318266 A1 | 10/2021 | Kishioka et al. | |

FOREIGN PATENT DOCUMENTS

| | | |
|---|---|---|
| JP | 2020-012823 A | 1/2020 |

OTHER PUBLICATIONS

Extended European Search Report dated Dec. 2, 2024 in connection with European Application No. 24190005.9.

* cited by examiner

*Primary Examiner* — C. Sun
(74) *Attorney, Agent, or Firm* — ArentFox Schiff LLP

(57) ABSTRACT

A signal is obtained which comprises voltage measurements obtained from the calibration fluid and voltage measurements obtained from the unknown fluid. Diffusion of the measurements during the transition from measuring the calibration fluid to measuring the unknown fluid is modelled using a first model. The drift of the measurements is modelled from the calibration fluid measurements using a second model. The first model identifies a value and corresponding time point at which the diffusion process has settled. A calibration voltage value is estimated at the corresponding time point and the difference between the identified value and the calibration electrical potential value is calculated to determine a voltage difference. This voltage difference is normalized by adjusting the difference by a shift amount determined in relation to the calibration electrical potential value and a predetermined voltage value. The normalized voltage is then used to determine the ion concentration of the unknown fluid.

20 Claims, 5 Drawing Sheets

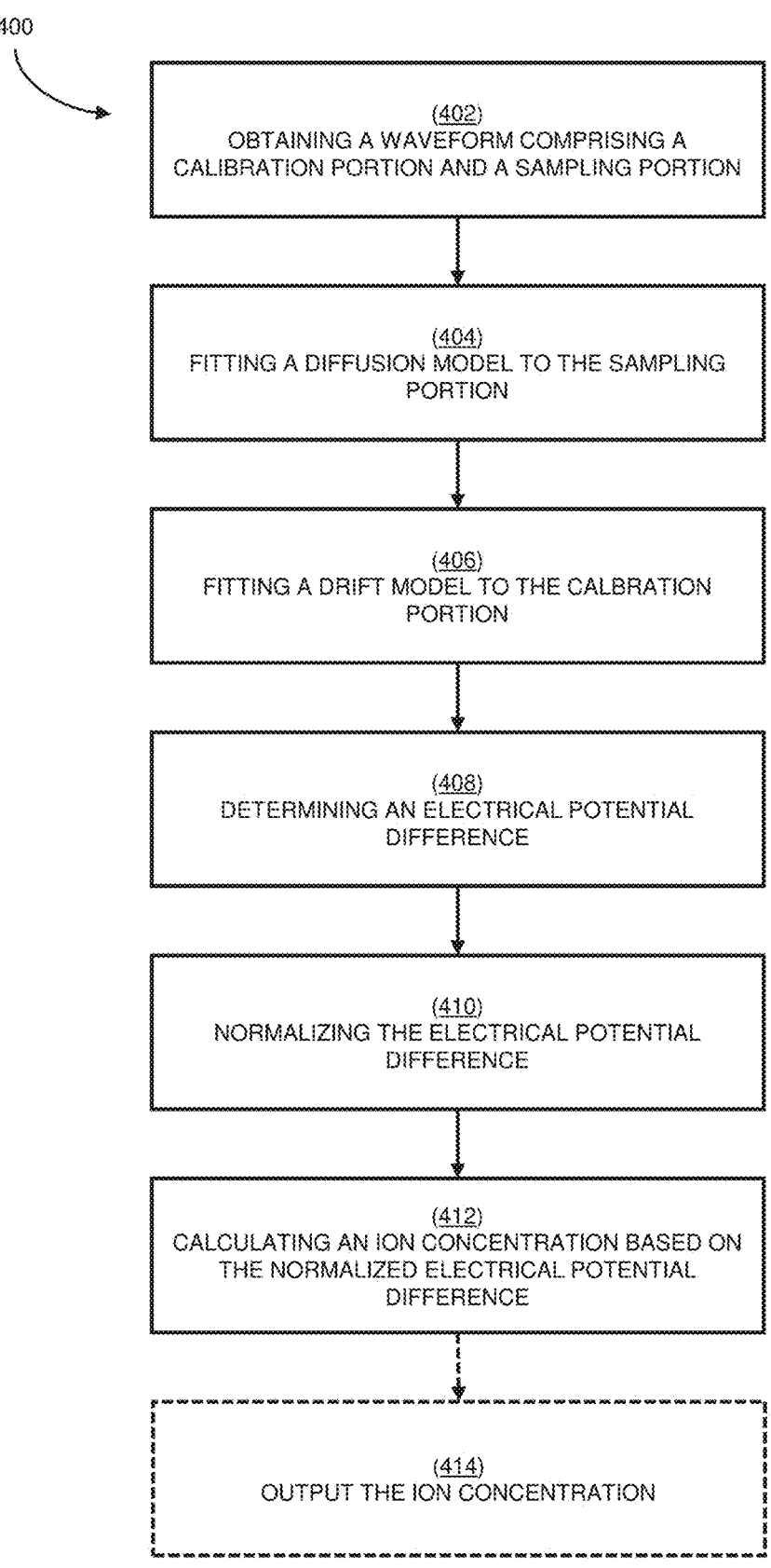

400

(402)
OBTAINING A WAVEFORM COMPRISING A
CALIBRATION PORTION AND A SAMPLING PORTION (404)
FITTING A DIFFUSION MODEL TO THE SAMPLING
PORTION (406)
FITTING A DRIFT MODEL TO THE CALBRATION
PORTION (408)
DETERMINING AN ELECTRICAL POTENTIAL
DIFFERENCE (410)
NORMALIZING THE ELECTRICAL POTENTIAL
DIFFERENCE (412)
CALCULATING AN ION CONCENTRATION BASED ON
THE NORMALIZED ELECTRICAL POTENTIAL
DIFFERENCE (414)
OUTPUT THE ION CONCENTRATION

FIGURE 4

SYSTEM AND METHOD FOR MEASUREMENT OF ION CONCENTRATION IN FLUID SAMPLES

FIELD OF INVENTION

The present disclosure relates to estimating the concentration of calcium ions within fluid samples. Particularly, but not exclusively, the present disclosure relates to a device and method for measuring the concentration of calcium ions within an unknown fluid relative to a calibration fluid; more particularly, but not exclusively, the present disclosure relates to a device and method for normalization of calcium ion concentration measurements obtained in relation to an unknown fluid and a calibration fluid.

BACKGROUND

Polymer based ion-selective electrodes (ISEs) are electrochemical sensors designed to detect and measure the concentration of calcium ions in a fluid (e.g., blood or other bodily fluid). ISEs work on the principle of selective ion binding, where a membrane in the electrode selectively allows only a specific ion—i.e., a calcium ion $(Ca2+)$—within a fluid sample to pass through and thereby generate an electrical potential. The electrical potential generated is proportional to the concentration of the specific ion within the fluid sample. The electrical potential is read by a measuring instrument and is subsequently converted into a calcium ion concentration value (e.g., using a suitable Nernst equation).

Within clinical and healthcare settings, ISEs are typically used to monitor calcium levels within a patient's blood. Such measurements are important for diagnosing and managing medical conditions related to calcium imbalance such as kidney disorders, hypocalcemia, hypercalcemia, and bone disease (e.g., rickets).

Existing approaches to monitoring calcium levels within a target (unknown) fluid measure differences between electrical potential measurements obtained from the target fluid and electrical potential measurements obtained from a calibration fluid. To obtain accurate calcium ion concentration values from such measurements, artefacts such as sensor drift need to be accounted for and the calibration values normalized. Typically, this is achieved by removing the drift component from the electrical potential signal. However, this may corrupt the morphology of the signal and thus lead to inaccurate recordal of calcium levels.

As such, there is a need for improved approaches to converting voltage potential measurements obtained from ISEs to ion concentrations.

SUMMARY OF INVENTION

In the present disclosure, a waveform comprising a sequence of measurements of electrical potential is obtained from a sensor. The waveform comprises a calibration portion, corresponding to electrical potential measurements obtained whilst a calibration fluid passes over the sensor, and a sampling portion, corresponding to electrical potential measurements obtained whilst an unknown fluid passes over the sensor. The calibration portion and the sampling portion are separately modelled to determine an electrical potential difference which is subsequently normalized and used to determine the ion concentration in the unknown fluid.

The present disclosure provides a device and method for measuring the ion concentration in an unknown fluid from electrical potential measurement obtained from the unknown fluid and a calibration fluid. A signal is obtained which comprises electrical potential (voltage) measurements obtained from the calibration fluid and electrical potential measurements obtained from the unknown fluid. The diffusion of the measurements during the transition from measuring the calibration fluid to measuring the unknown fluid is modelled using a first model. The drift of the measurements is modelled from the calibration fluid measurements using a second model. The first model is used to identify a value and corresponding time point at which the diffusion process has settled—i.e., when the electrical potential measurements are predicted to relate solely to the unknown fluid. A calibration electrical potential value is estimated at the corresponding time point and the difference between the identified value and the calibration electrical potential value is calculated to determine an electrical potential difference. This electrical potential difference is normalized by adjusting the difference by a shift amount determined in relation to the calibration electrical potential value and a predetermined electrical potential value. The normalized electrical potential difference is then used to determine the ion concentration of the unknown fluid.

As such, aspects of the present disclosure allow accurate and consistent measurements of the ion concentration of an unknown fluid to be determined from electrical potential measurements. When incorporated into a device (such as a calcium ion-concentration device), the method of the present disclosure improves the accuracy and performance of the device whilst also increasing the longevity of the device by allowing usable and accurate measurements to be obtained from sensors which are exhibiting drift or other gradual failures. Moreover, the present disclosure allows for the sensitivity of a device's sensor(s) to be incorporated into the calculation of ion concentration thereby improving the accuracy of the reported measurements and providing an efficient mechanism for device calibration.

Further features and aspects of the disclosure are provided in the appended claims.

BRIEF DESCRIPTION OF DRAWINGS

The present disclosure will now be described by way of example only with reference to the accompanying drawings in which:

FIG. 4 shows a method for measurement of ion concentration in fluid samples according to an aspect of the present disclosure.

DETAILED DESCRIPTION

Many applications within clinical and healthcare settings involve the estimation of the ion concentration of a fluid sample from electrical potential measurements obtained from the fluid sample. The relative change in electrical potential between the fluid sample and a calibration fluid is typically used to convert electrical potential measurements to ion concentration values. To obtain usable and accurate ion concentration values, the electrical potential measurements are typically processed to account for drift and/or normalization which may induce errors as part of the processing (e.g., by corrupting the morphology of the underlying signal). The present disclosure is directed to a device and method for normalizing electrical potential difference measurements whilst also accounting for sensor drift without corrupting the morphology of the underlying signal.

Figure 1B:
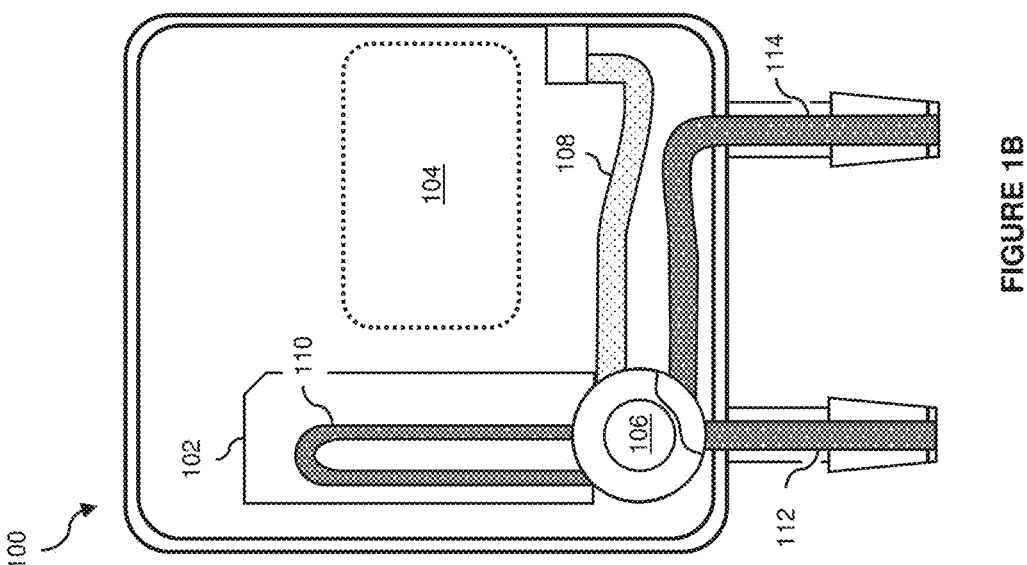
FIGS. 1A and 1B show a device according to an aspect of the present disclosure.
Figure 1A:
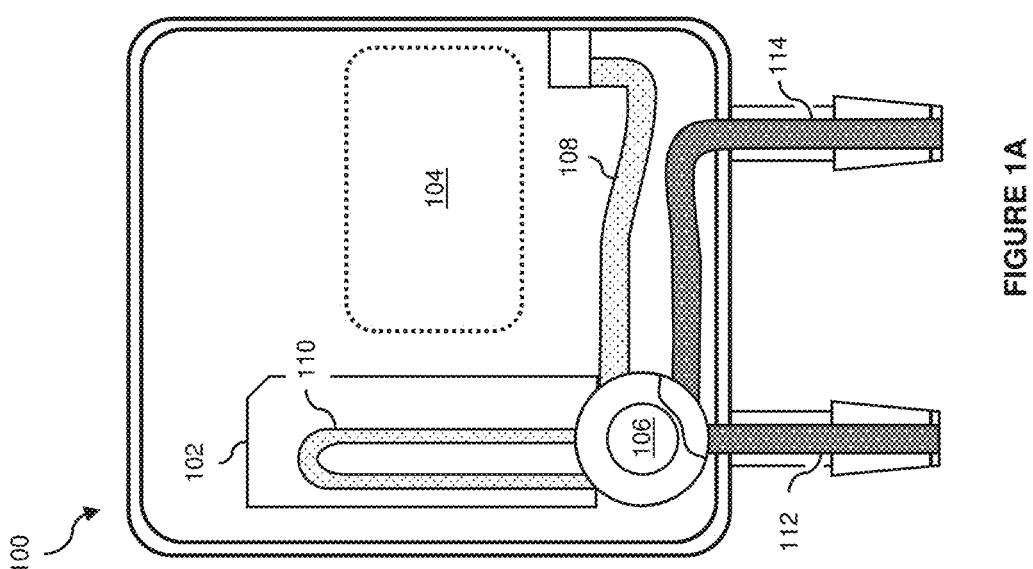

FIGS. 1A and B show a device 100 for measuring electrical potential from a fluid sample according to an aspect of the present disclosure.

The device 100 comprises a sensor assembly 102, a reservoir 104, and a valve 106. A first fluid channel 108 connects the reservoir 104 and the valve 106. A second fluid channel 110 passes through and over the sensor assembly 102 from the valve 106. A fluid inlet 112 and a fluid outlet 114 are both connected to the valve 106. The device 100 is an ion-selective electrode device operable to detect and measure the concentration of ions—e.g., calcium ions (Ca2+)—in a solution such as blood or other bodily fluid.

The sensor assembly 102 is a polymer-based ion-selective electrode (ISE). As is known, an ISE provides spot monitoring by converting the activity of an ion dissolved in a solution to electrical potential. ISEs are widely used within the fields of medicine, biology, and analytical chemistry. Typical applications include using an ISE in biomedical devices to measure the concentration of calcium, potassium, and sodium in bodily fluids such as blood, and using an ISE for pollution monitoring by measuring the concentration of fluorine, copernicium, etc. in water.

In use, the sensor assembly 102 is typically "flushed" with a calibration fluid before being exposed to an unknown fluid from which measurements are to be take. Here, the unknown fluid corresponds to a fluid having an unknown ion concentration and may correspond to a solution such as blood or other bodily fluid. As such, the unknown fluid may alternatively be referred to as a sampling fluid, a solution, or a target fluid. The calibration fluid flows from the reservoir 104 through the first fluid channel 108 to the valve 106. The calibration fluid flows back to the reservoir 104 through a further fluid channel. Alternatively, the calibration fluid flows back to the reservoir 104 through the first fluid channel 108. The unknown fluid flows from an external source (not shown) through the fluid inlet 112 to the valve 106 and from the valve 106 through the fluid outlet 114 to be further disposed of (e.g. flows to waste).

The valve 106 is controlled by an external controller (not shown) such as a computing device or other external device. Configuration settings of the valve 106 are adjusted by means of the external controller. Specifically, commands are sent to the device 100 to control actuation of the valve 106.

In a first mode of operation (FIG. 1A), the valve 106 is configured to allow the calibration, or calibrant, fluid to flow from the reservoir 104 through the first fluid channel 108 to the second fluid channel 110. The sensor assembly 102 then takes reference measurements from the calibration fluid flowing through the second fluid channel 110.

In a second mode of operation (FIG. 1B), the valve 106 is configured to allow the unknown fluid to flow from the external source (not shown) through the fluid inlet 112 to the second fluid channel 110. The sensor assembly 102 then takes measurements from the unknown fluid flowing through the second fluid channel 110. The unknown fluid passes from the second fluid channel 110 to the fluid outlet 114 and out of the device 100.

The sensor assembly 102 responds differently to the two fluids. The response of the sensor assembly 102 is measured as a voltage developed between the inside and the outside of the ion sensitive membrane of the sensor assembly 102. The signal (i.e., the time-series signal or waveform) of the change in voltage received from the sensor assembly 102 over time will capture the transition of the sensor assembly 102 from measuring the calibration fluid to measuring the unknown fluid. A portion of the waveform comprising measurements of the calibration fluid is referred to as a calibration portion, whilst a portion of the waveform comprising measurement of the unknown fluid is referred to as a sampling portion.

Figure 2:
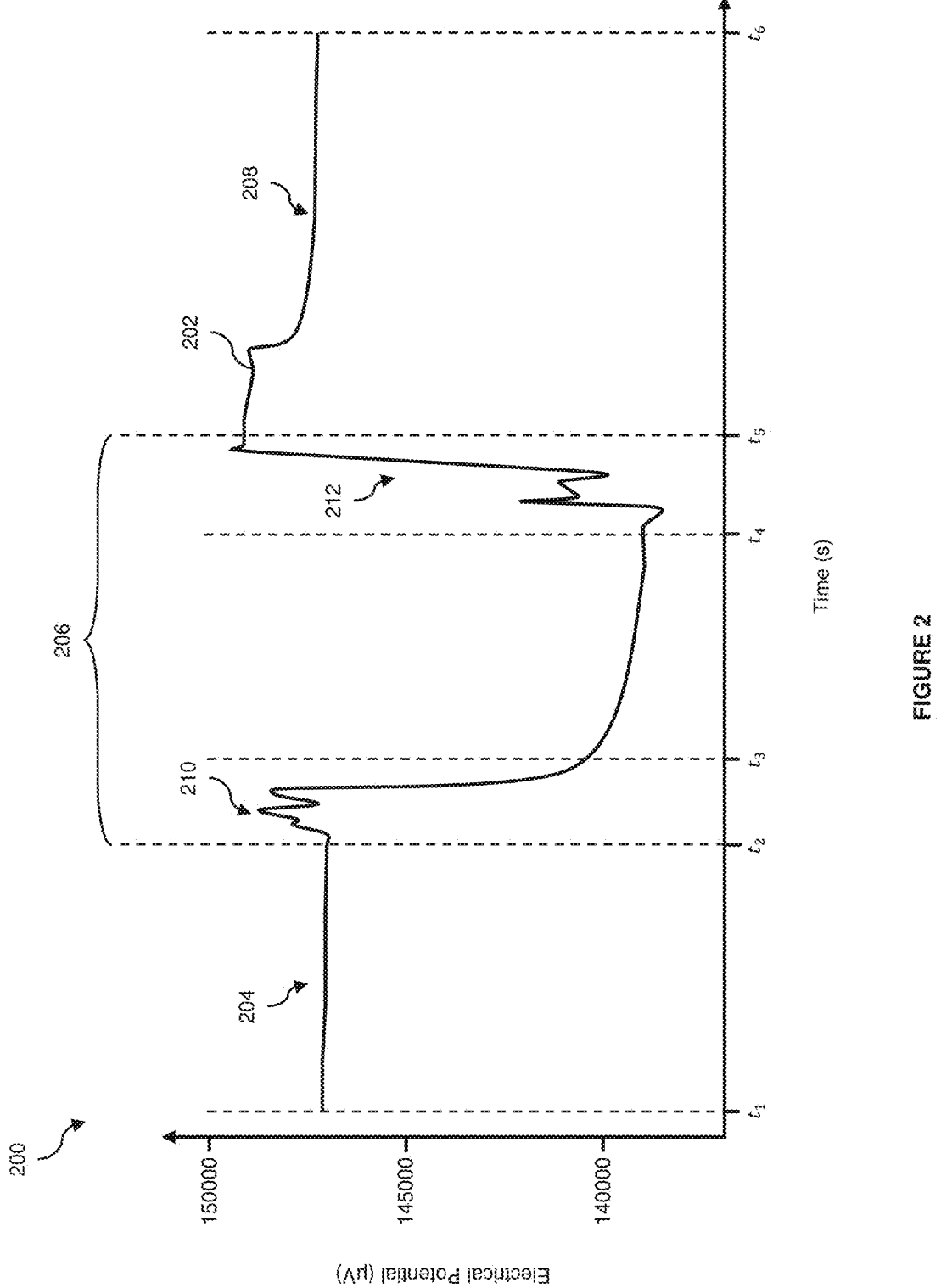
FIG. 2 shows a voltage potential signal comprising a calibration portion and a sampling portion obtained from the device shown in FIGS. 1A and 1B.

FIG. 2 shows a plot 200 of a signal obtained from the device 100 shown in FIGS. 1A and 1B.

The plot 200 comprises a signal 202 (or waveform) comprising a first calibration portion 204, a sampling portion 206, and a second calibration portion 208. The sampling portion 206 comprises a first transition portion 210 and a second transition portion 212. The first calibration portion 204 of the signal 202 (i.e., the portion of the signal 202 between time points $t_1$ and $t_2$) comprises a time-ordered sequence of electrical potential measurements obtained from a sensor (e.g., the sensor assembly 102 of the device 100 shown in FIGS. 1A and 1B) as a calibration fluid passes over the sensor during the time period $t_1{\to}t_2$. The electrical potential measurements obtained from the sensor are voltage measurements in e.g., $\mu V$. The sampling portion 206 of the signal 202 (i.e., the portion of the signal 202 between time points $t_2$ and $t_5$) comprises a time-ordered sequence of electrical potential measurements obtained from the sensor as an unknown fluid passes over the sensor during the time period $t_2{\to}t_5$. The sampling portion 206 of the signal 202 comprises two sub-portions: the first transition portion 210 and the second transition portion 212. The first transition portion 210 comprises a time-ordered sequence of electrical potential measurements which capture the change in device state as the sensor transitions from measuring the calibration fluid at time point $t_2$ to measuring the unknown fluid at time point $t_3$. Similarly, the second transition portion 214 comprises a time-ordered sequence of electrical potential measurements which capture the change in device state as the sensor transitions from measuring the unknown fluid at time point $t_4$ to measuring the calibration fluid at time point $t_5$. The second calibration portion 208 of the signal 202 (i.e., the portion of the signal 202 between time points $t_5$ and $t_6$) comprises a time-ordered sequence of electrical potential measurements obtained from the sensor as a calibration fluid passes over the sensor during the time period $t_5{\to}t_6$.

In many applications, the electrical potential measurements captured within the signal 202 during the calibration period(s) and the sampling period are used to determine a concentration of ions within the unknown fluid. More particularly, the difference between electrical potential measurements obtained from the calibration fluid and the unknown fluid is used to determine a concentration of calcium ions (Ca2+) within the unknown fluid. To convert the electrical potential difference (in volts) to an ion concentration, iCa (in millimoles per litre), the following Nernst equation is used:

$$iCa = 10^{\frac{v_{\Delta}+(s\log_{10}[CAL])}{s}}. \tag{1}$$

Here, $v_{\Delta}$ is the difference in electrical potential measurements obtained from the first calibration portion 204 (and/or the second calibration portion 208) and electrical potential measurements obtained from the sampling portion 206, CAL is the Ca2+ ion concentration in the calibration fluid, and s is a measure of the sensitivity of the sensor used to obtain the electrical potential measurements. In one embodiment, s is from 25 μV/dec to 30 μV/dec.

To account for the drift of the sensor assembly—i.e., the gradual change in the output of the sensor assembly over time—prior approaches uniquely model the drift and remove the drift from the signal. This approach has the additional effect of normalizing, or DC shifting, all measurements to define the calibration measurements as zero volts. However, such an approach may induce error by corrupting the morphology of the original signal and does not account for variation in the calibration estimations. The present disclosure seeks to address these problems by independently modelling the calibration portion and sampling portion of the signal to determine an electrical potential difference between the calibration and unknown fluid and subsequently normalizing the electrical potential difference according to a fixed electrical potential value.

Figure 3:
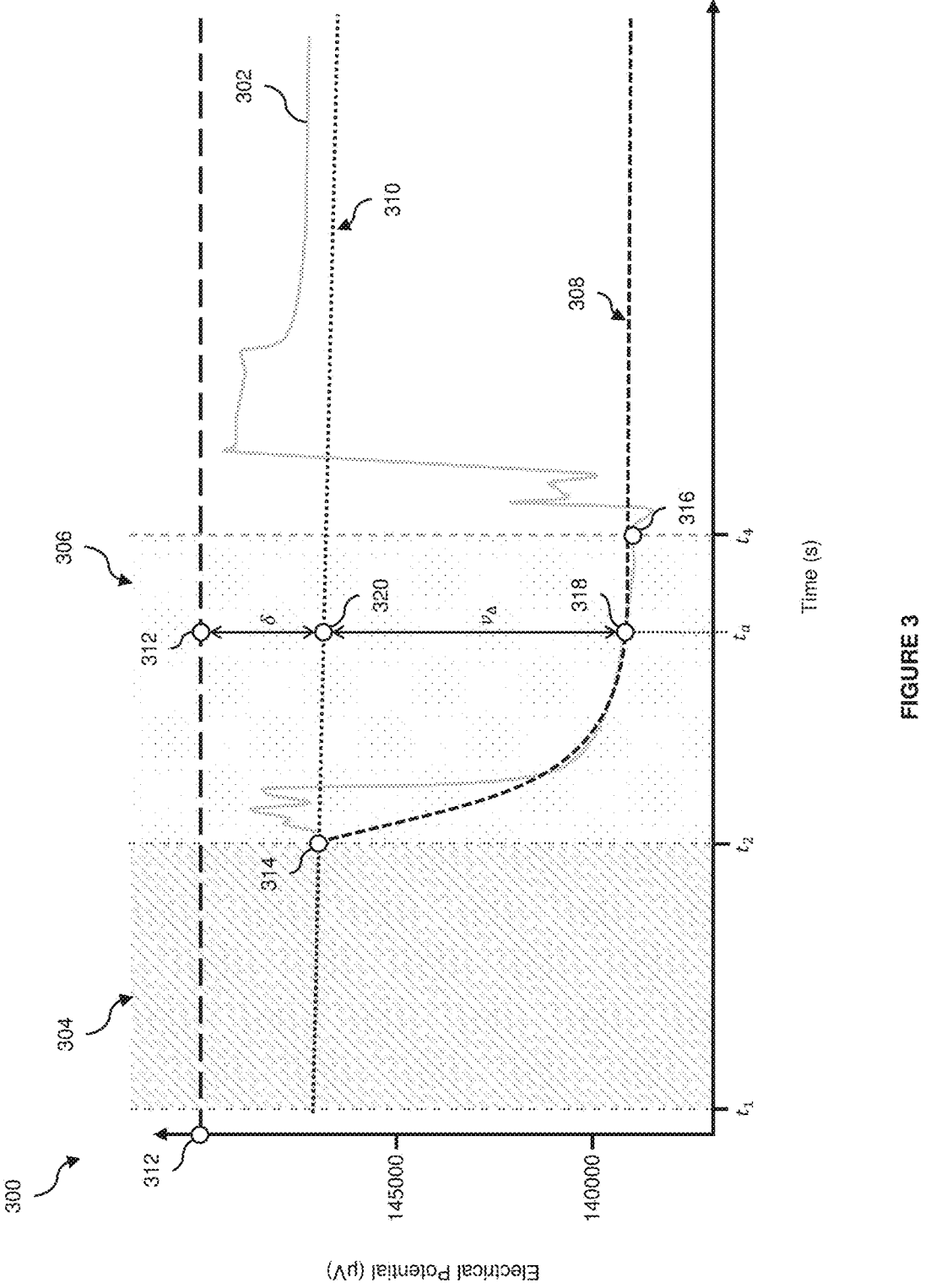
FIG. 3 shows a diffusion model and a drift model fit to the voltage potential signal shown in FIG. 2.

FIG. 3 shows a plot 300 of a diffusion model and a drift model fit to a signal.

The plot 300 comprises a signal 302, a calibration portion 304, and a sampling portion 306. The plot 300 further shows a diffusion model 308, a drift model 310, and a fixed electrical potential value 312. The plot 300 also shows a first transition point 314, a second transition point 316, a settled electrical potential value 318, and a calibration electrical potential value 320.

The signal 302 (or waveform) corresponds to the signal 202 shown in FIG. 2. The calibration portion 304 highlights the portion of the signal 302 comprising measurements obtained from a calibration fluid passing over the sensor during the time period $t_1 \rightarrow t_2$ and the sampling portion 306 highlights the portion of the signal 302 comprising measurements obtained from an unknown fluid passing over the sensor during the time period $t_2 \rightarrow t_4$. The sampling portion 306 shown in FIG. 3 differs to that shown in FIG. 2. More particularly, the sampling portion 306 spans the time period from the first transition point 314 at time point $t_2$ to the second transition portion 316 at time point $t_3$. These transition points correspond to the points at which the device changes state from measuring the calibration fluid to measuring the unknown fluid and vice versa. The points at which the signal 302 begins to transition from one state to another may be identified using any suitable technique. For example, the time point $t_2$ may correspond to the time point at which the command is sent to the device to control actuation of the valve to switch from allowing calibration fluid to flow to the sensor assembly to allowing the unknown fluid to flow to the sensor assembly. Similarly, the time point $t_4$ may correspond to the time point at which the command is sent to the device to control actuation of the valve to switch from allowing the unknown fluid to flow to the sensor assembly to allowing the calibration fluid to flow to the sensor assembly. Alternatively, a change point detection algorithm is used such as that described in PCT/EP2022/062366 which is hereby incorporated herein by reference in its entirety.

The diffusion model 308 comprises a model fit to the sampling portion 306 of the signal 302 (i.e., fit to the measurements of the signal 302 between time point $t_2$ and $t_4$). The diffusion model 308 is used to model the diffusion process (or reverse diffusion process depending on whether there is an increase or decrease in ion concentration) as the sensor transitions from measuring the calibration fluid to measuring the unknown fluid. A sensor, particularly an ion-selective electrode, exhibits a dominant exponential growth or decay when transitioning between measuring different fluids. The diffusion model 308 thus models the diffusion of the sensor measurements as the sensor assembly transitions from measuring the calibration fluid to measuring the unknown fluid. The diffusion model 308 is used to predict a point at which the sensory assembly has settled, and fully transitioned, to measuring the unknown fluid. This point is identified as the settled electrical potential value 318, $\hat{v}_{UNK}$, at time point $t_a$ which corresponds to an asymptote of the diffusion model 308. In one embodiment, the diffusion model 308 is an exponential model such that one or more exponential functions are fit to the sampling portion 306 of the signal 302 to determine the parameters of the diffusion model 308. As is known, the parameters of the one or more fit exponential functions may then be used to determine the settled point, or asymptote, of the one or more fit exponential functions.

The time point $t_a$ (associated with the settled electrical potential value 318, $\hat{v}_{UNK}$) corresponds to the time at which the device is predicted to be measuring the unknown fluid. As such, the estimated electrical potential measurement from the diffusion model 308 at time point $t_a$ is used as the electrical potential measurement related to the unknown fluid. As stated above, this measurements is compared against a corresponding measurement of the calibration fluid to determine the electrical potential measurement difference (or relative electrical potential measurement).

The drift model 310 comprises a model fit to the calibration portion 304 of the signal 302 (i.e., fit to the measurements of the signal 302 between the time points $t_1$ and $t_2$). The drift model 310 models the drift of the sensor assembly. Here, the drift of the sensor assembly is to be understood as the gradual change in the output of the sensor assembly over time which may lead to inaccurate or inconsistent measurements being obtained from the sensor assembly. The drift model 310 models, and accounts for, the drift of the sensor assembly by fitting a model to the calibration portion 304 of the signal 302. In one embodiment, the drift model 310 is a linear model such as a linear regression model. Alternatively, the drift model 310 is a non-linear model such as a polynomial or spline model. The drift model 310 is fit by estimating the parameters of the model using the measurements of the signal 302 within the calibration portion 304. Once fit, the drift model 310 is used to obtain an estimated calibration measurement at the time point $t_a$—i.e., the calibration electrical potential value 320, $\hat{v}_{CAL}$. The electrical potential difference, $v_\Delta$, between the settled electrical potential value 318, $\hat{v}_{UNK}$, and the calibration electrical potential value 320, $\hat{v}_{CAL}$, corresponds to the difference in electrical potential measurements used within the Nernst equations (such as that defined in Equation (1) above).

To account for errors associated with variation in the calibration estimation within the electrical potential difference, the electrical potential difference $v_\Delta$ is normalized prior to being used to calculate an ion concentration of the unknown fluid. The electrical potential difference $v_\Delta$ is normalized by shifting the electrical potential difference $v_\Delta$ by an offset value δ. The offset value δ is dynamically determined by calculating the difference between the calibration electrical potential value 320 and a predetermined electrical potential value—i.e., the fixed electrical potential value 312. The fixed electrical potential value 312, $v_{FIXED}$, acts as a fixed, standard, normalizing factor which is applied to all relative values estimated by the diffusion model and the drift model. The fixed electrical potential value 312, $v_{FIXED}$, may be any suitable value such as any value greater than 0V. In one implementation, the fixed electrical potential value 312 is 5V.

The normalized electrical potential difference, $norm(v_A)$, which is used to calculate the ion concentration of the unknown fluid for the time period $t_1 \rightarrow t_4$ is calculated as $norm(v_A)=v_A-\delta=(\hat{v}_{UNK}-\hat{v}_{CAL})-(\hat{v}_{CAL}-v_{FIXED})$.

To calculate the ion concentration of the unknown fluid, the normalized electrical potential difference $norm(v_A)$ may be used directly in place of the voltage difference, $v_A$, within the Nernst equation defined in Equation (1) above. Alternatively, an adapted, or modified, Nernst equation which is adapted to model a sensitivity of the sensor assembly may be used. The sensitivity of the sensor assembly is modelled based on a relationship between voltage (potential) and ion concentration. The model may be linear, in which case the modified Nernst equation is of the form:

$$iCa = 10^{\frac{(norm(v_A)-c)}{s}}. \tag{2}$$

Where c is the bias (y-intercept) of the linear sensitivity model and s is the slope, or gradient, of the linear model. The linear sensitivity model may be fit using a plurality of historical measurements (i.e., historical electrical potential difference measurements with accompanying ion concentration values). A linear regression model may then be used to estimate the linear relationship between electrical potential difference measurements and ion concentration values. The bias and slope of the fit linear regression model may then be used within the modified Nernst equation in Equation (2) to estimate ion concentration iCa from normalized electrical potential difference $norm(v_A)$.

Alternatively, the model may be nonlinear, in which case the modified Nernst equation is of the form:

$$iCa = 10^{\frac{-b\pm\sqrt{b^2-4a(c-norm(v_A))}}{2a}}. \tag{3}$$

Where a, b, c are the parameters of a second degree polynomial sensitivity model describing the Nernst relationship $ax^2+bx+c=0$. The nonlinear sensitivity model may be fit using a plurality of historical electrical potential difference measurements with accompanying ion concentration values. Nonlinear regression may be used to estimate the parameters of the nonlinear sensitivity model which model the nonlinear relationship between electrical potential difference measurements and ion concentration values. The estimated values of a, b, c may then be used within the modified Nernst equation in Equation (3) to estimate ion concentration iCa from normalized electrical potential difference $norm(v_A)$.

In one embodiment, the linear and/or nonlinear models used within the modified Nernst equations defined in Equations (2) and (3) are fit using a Huber regressor. Advantageously, the Huber regressor provides a robust fit of the linear and/or nonlinear model, and thus more accurately models the sensitivity of the sensor assembly, even if the data used to fit the model contains outliers.

The plurality of historical electrical potential difference measurements with accompanying ion concentration values may be obtained during a setup, or calibration, period. The setup, or calibration, period may be performed at the start of operation (e.g., when the device comprising the sensor assembly is initially powered on). Additionally, or alternatively, the setup, or calibration, period may be performed periodically to update the sensitivity model (e.g., every 8 hours, every 1 day, every 1 week, etc.).

FIG. 4 shows a method 400 for measurement of ion concentration in fluid samples according to an aspect of the present disclosure.

The method 400 comprises the steps of obtaining 402 a waveform comprising a calibration portion and a sampling portion, fitting 404 a diffusion model to the sampling portion, fitting 406 a drift model to the calibration portion, determining 408 an electrical potential difference, normalizing 410 the electrical potential difference, and calculating 412 an ion concentration based on the normalized electrical potential difference. The method 400 also comprises the optional step of outputting 414 the ion concentration. In one embodiment, the method 400 is performed by a device such as the device 100 shown in FIG. 1 or the computing system 500 shown in FIG. 5.

At the step of obtaining 402, a waveform comprising a calibration portion and a sampling portion is obtained (e.g., the signal 302 of FIG. 3 which comprises the calibration portion 304 and the sampling portion 306). The calibration portion comprises electrical potential measurements obtained from a calibration fluid passing over a sensor (e.g., the sensor assembly 102 of the device 100 shown in FIG. 1) during a first time period. The sampling portion comprises electrical potential measurements obtained from an unknown fluid passing over the sensor during a second time period.

At the step of fitting 404, a diffusion model is fit to the sampling portion of the waveform to identify a first time point associated with a settled electrical potential value (i.e., a settled voltage value) determined from the diffusion model (e.g., the diffusion model 308 shown in FIG. 3 which is used to estimate the time point $t_a$ associated with the settled electrical potential value 318).

The diffusion model is used to model the diffusion process (or reverse diffusion process depending on whether there is an increase or decrease in ion concentration) as the sensor transitions from measuring the calibration fluid to measuring the unknown fluid. A sensor, particularly an ion-selective electrode, exhibits a dominant exponential growth or decay when transitioning between measuring different fluids. Thus, the diffusion model is used to model the diffusion, or decay, of the sensor measurements as the sensor transitions from measuring calibration fluid to measuring unknown fluid. This allows an accurate estimate of the electrical potential of the unknown fluid to be obtained because the model is used to estimate a time point at which the transition has completed and the sensor has reached a settled measurement value for the unknown fluid.

In one embodiment, the diffusion model comprises an exponential function. In such an embodiment, the step of fitting 404 the diffusion model comprises estimating one or more parameters of the exponential function based on the sampling portion of the waveform. The one or more parameters may be estimated using any appropriate optimization technique such as least squares.

At the step of fitting 406, a drift model is fit to the calibration portion of the waveform to identify a calibration electrical potential value (i.e., calibration voltage value) from the drift model at the first time point (e.g., the drift model 310 shown in FIG. 3 which is used to estimate the calibration electrical potential value 320 at time point $t_a$).

The drift model models the drift of the sensor—i.e., the gradual change in the output of the sensor over time which may lead to inaccurate or inconsistent measurements being obtained from the sensor assembly.

In one embodiment, the drift model comprises a linear function. In such an embodiment, the step of fitting 406 the drift model comprises estimating one or more parameters of the linear function based on the calibration portion of the waveform. The one or more parameters may be estimated using any appropriate optimization technique such as least squares.

At the step of determining 408, an electrical potential difference between the settled electrical potential value and the calibration electrical potential value is determined (e.g., the electrical potential difference $v_A$ shown in FIG. 3).

At the step of normalizing 410, the electrical potential difference is normalized by shifting the electrical potential difference by an offset value thereby generating a normalized electrical potential difference (i.e., a normalized voltage difference). The offset value corresponds to a difference between the calibration electrical potential value and a fixed electrical potential value (i.e., a predetermined voltage value). In the example shown in FIG. 3, the electrical potential difference $v_A$ is shifted by the offset value $\delta$, determined as the difference between the calibration electrical potential value 320, and the fixed electrical potential value 312, to generate the normalized electrical potential difference $norm(v_A) = v_A - \delta$. In one embodiment, the fixed electrical potential value is a predetermined electrical potential value greater than 0V, and in one implementation is 5V.

At the step of calculating 412, an ion concentration of the unknown fluid is calculated based on the normalized electrical potential difference.

The ion concentration of the unknown fluid is calculated from the normalized electrical potential difference using a Nernst equation. Any of the Nernst equations described above in relation to Equations (1)-(3) may be used to determine the ion concentration of the unknown fluid from the normalized electrical potential difference.

As stated above in relation to FIG. 3, a modified Nernst equation may be used to determine the ion concentration of the unknown fluid from the normalized electrical potential difference. The modified Nernst equation is adapted to model a sensitivity of the sensor based on a relationship between electrical potential difference and ion concentration. The relationship may be linear (i.e., a linear model is used to model the sensitivity of the sensor) or nonlinear (i.e., a nonlinear model is used to model the sensitivity of the sensor). As such, in some embodiments, the method 400 may further comprise modelling the sensitivity of the sensor assembly using a plurality of historical electric potential difference measurements and corresponding ion concentrations using a regression algorithm, such as a Huber regressor (as described in more detail above in relation to FIG. 3).

At the optional step of outputting 414, the ion concentration of the unknown fluid is output. Outputting the ion concentration of the unknown fluid comprises outputting the ion concentration for display to a user (e.g., presenting the ion concentration on a display viewable to a user). Additionally, or alternatively, outputting the ion concentration of the unknown fluid comprises transmitting the ion concentration for further analysis or review.

Figure 5:
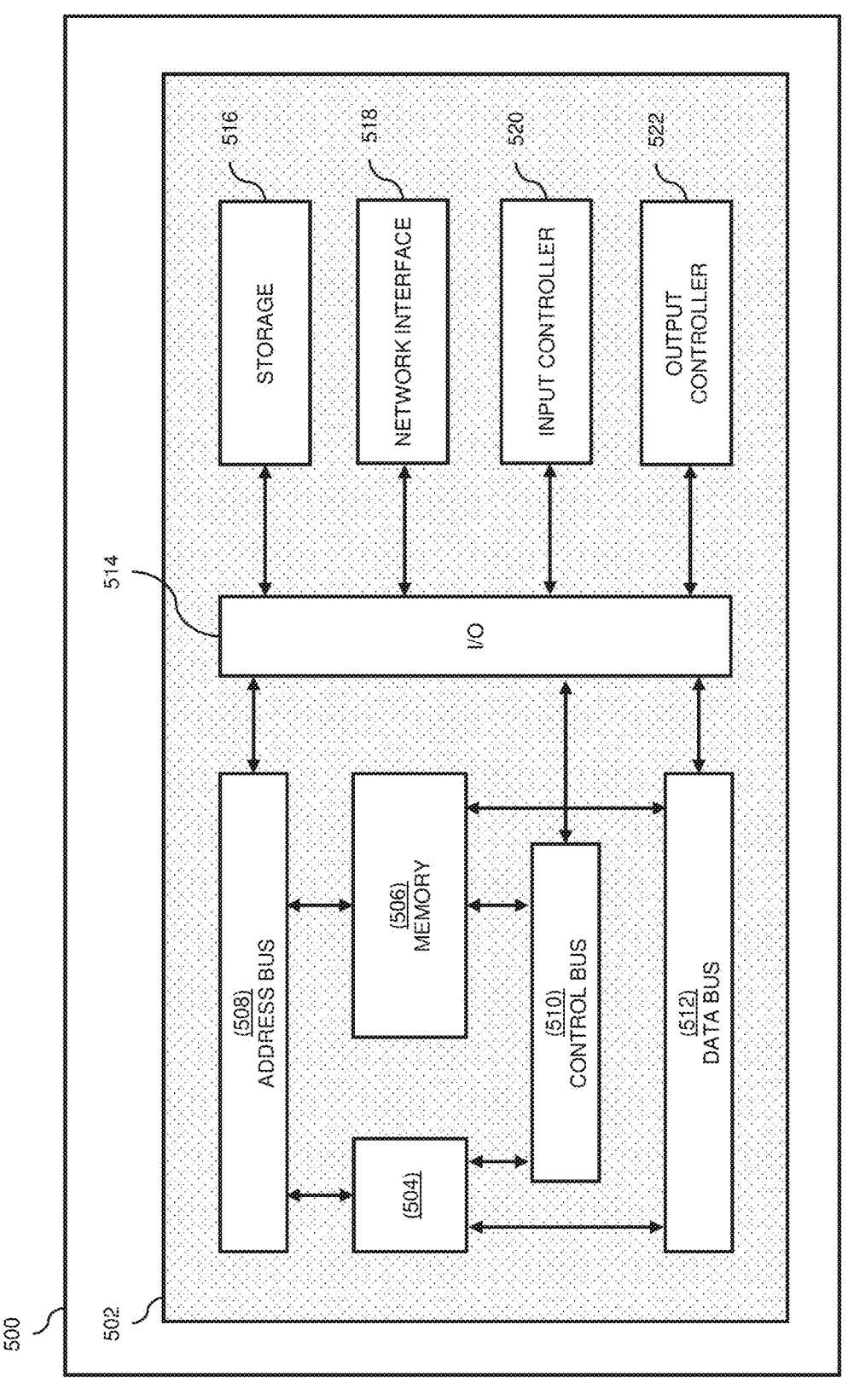
FIG. 5 shows an example computing system for identifying a deviation point within a time-series signal according to an aspect of the present disclosure.

FIG. 5 shows an example computing system for carrying out the methods of the present disclosure. Specifically, FIG. 5 shows a block diagram of an embodiment of a computing system according to example embodiments of the present disclosure.

Computing system 500 can be configured to perform any of the operations disclosed herein such as, for example, any of the operations discussed with reference to the functional units described in relation to FIG. 1 (e.g., the external controller) or the steps discussed with reference to the method 400 shown in FIG. 4. Computing system includes one or more computing device(s) 502. The one or more computing device(s) 502 of computing system 500 comprise one or more processors 504 and memory 506. One or more processors 504 can be any general purpose processor(s) configured to execute a set of instructions. For example, one or more processors 504 can be one or more general-purpose processors, one or more field programmable gate array (FPGA), and/or one or more application specific integrated circuits (ASIC). In one embodiment, one or more processors 504 include one processor. Alternatively, one or more processors 504 include a plurality of processors that are operatively connected. One or more processors 504 are communicatively coupled to memory 506 via address bus 508, control bus 510, and data bus 512. Memory 506 can be a random access memory (RAM), a read only memory (ROM), a persistent storage device such as a hard drive, an erasable programmable read only memory (EPROM), and/or the like. The one or more computing device(s) 502 further comprise I/O interface 514 communicatively coupled to address bus 508, control bus 510, and data bus 512.

Memory 506 can store information that can be accessed by one or more processors 504. For instance, memory 506 (e.g., one or more non-transitory computer-readable storage mediums, memory devices) can include computer-readable instructions (not shown) that can be executed by one or more processors 504. The computer-readable instructions can be software written in any suitable programming language or can be implemented in hardware. Additionally, or alternatively, the computer-readable instructions can be executed in logically and/or virtually separate threads on one or more processors 504. For example, memory 506 can store instructions (not shown) that when executed by one or more processors 504 cause one or more processors 504 to perform operations such as any of the operations and functions for which computing system 500 is configured, as described herein. In addition, or alternatively, memory 506 can store data (not shown) that can be obtained, received, accessed, written, manipulated, created, and/or stored. In some implementations, the one or more computing device(s) 502 can obtain from and/or store data in one or more memory device(s) that are remote from the computing system 500.

Computing system 500 further comprises storage unit 516, network interface 518, input controller 520, and output controller 522. Storage unit 516, network interface 518, input controller 520, and output controller 522 are communicatively coupled to the central control unit (i.e., the memory 506, the address bus 508, the control bus 510, and the data bus 512) via I/O interface 514.

Storage unit 516 is a computer readable medium, preferably a non-transitory computer readable medium, comprising one or more programs, the one or more programs comprising instructions which when executed by the one or more processors 504 cause computing system 500 to perform the method steps of the present disclosure. Alternatively, storage unit 516 is a transitory computer readable medium. Storage unit 516 can be a persistent storage device such as a hard drive, a cloud storage device, or any other appropriate storage device.

Network interface 518 can be a Wi-Fi module, a network interface card, a Bluetooth module, and/or any other suitable wired or wireless communication device. In an embodiment, network interface 518 is configured to connect to a network such as a local area network (LAN), or a wide area network (WAN), the Internet, or an intranet.

NON-LIMITING EXAMPLE ASPECTS OF THE DISCLOSURE

Example 1: A device for measurement of ion concentration in fluid samples, the device comprising: a sensor assembly configured to obtain voltage measurements from a fluid sample passing thereover; and a control unit comprising one or more processors configured to: obtain, from the sensor assembly, a signal comprising a calibration portion and a sampling portion, the calibration portion comprising voltage measurements obtained from a calibration fluid passing over the sensor during a first time period and the sampling portion comprising voltage measurements obtained from an unknown fluid passing over the sensor during a second time period; fit a first model to the sampling portion of the signal to identify a first time point associated with a settled voltage value determined from the first model; fit a second model to the calibration portion of the signal to identify a calibration voltage value from the second model at the first time point; determine a voltage difference between a voltage value of the sampling portion at the first time point and the calibration voltage value; shift the voltage difference by a shift amount to determine a normalized voltage difference, the shift amount corresponding to a difference between the calibration voltage value and a predetermined voltage value; and calculate an ion concentration of the unknown fluid based on the normalized voltage difference.

Example 2: The device of example 1 wherein the ion concentration of the unknown fluid is calculated from the normalized voltage difference using a Nernst equation.

Example 3: The device of any preceding example wherein the ion concentration of the unknown fluid is calculated from the normalized voltage difference using a modified Nernst equation adapted to model a sensitivity of the sensor assembly based on a relationship between voltage and ion concentration.

Example 4: The device of example 3 wherein the relationship is linear.

Example 5: The device of example 3 wherein the relationship is nonlinear.

Example 6: The device of any of examples 3 to 5 wherein the relationship between voltage and ion concentration is learnt from a plurality of historical measurements using a regression algorithm.

Example 7: The device of example 6 wherein the regression algorithm is a Huber regressor.

Example 8: The device of any preceding example wherein the one or more processors of the control unit are further configured to: output the ion concentration of the unknown fluid.

Example 9: The device of any preceding example wherein the first model is an exponential model.

Example 10: The device of any preceding example wherein the second model is a linear model.

Example 11: The device of any preceding example wherein the predetermined voltage value is greater than 0V.

Example 12: The device of example 11 wherein the predetermined voltage value is 5V.

Example 13: The device of any preceding example wherein the sensor assembly comprises an electrode.

Example 14: The device of example 13 wherein the electrode is a polymer-based ion-selective electrode.

Example 15: A computer-implemented method for measurement of ion concentration in fluid samples, the computer-implemented method comprising: obtaining a waveform comprising a calibration portion and a sampling portion, the calibration portion comprising electrical potential measurements obtained from a calibration fluid passing over a sensor during a first time period and the sampling portion comprising electrical potential measurements obtained from an unknown fluid passing over the sensor during a second time period; fitting a diffusion model to the sampling portion of the waveform to identify a first time point associated with a settled electrical potential value determined from the diffusion model; fitting a drift model to the calibration portion of the waveform to identify a calibration electrical potential value from the drift model at the first time point; determining an electrical potential difference between the settled electrical potential value and the calibration electrical potential value; normalizing the electrical potential difference by shifting the electrical potential difference by an offset value thereby generating a normalized electrical potential difference, wherein the offset value corresponds to a difference between the calibration electrical potential value and a fixed electrical potential value; and calculating an ion concentration of the unknown fluid based on the normalized electrical potential difference.

Example 16: The computer-implemented method of example 15 further comprising: outputting the ion concentration of the unknown fluid.

Example 17: The computer-implemented method of example 15 or example 16 wherein the diffusion model comprises an exponential function such that the step of fitting the diffusion model comprises estimating one or more parameters of the exponential function based on the sampling portion of the waveform.

Example 18: The computer-implemented method of any of examples 15 to 17 wherein the drift model comprises a linear function such that the step of fitting the drift model comprises estimating one or more parameters of the linear function based on the calibration portion of the waveform.

Example 19: The computer-implemented method of any of examples 15 to 18 wherein the ion concentration of the unknown fluid is calculated from the normalized electrical potential difference using a Nernst equation.

Example 20: A non-transitory computer readable medium storing instructions which, when executed by one or more processors of a device, cause the device to carry out the steps of any of examples 15 to 19.

The invention claimed is:

1. A device for measurement of ion concentration in fluid samples, the device comprising:

a sensor assembly configured to obtain voltage measurements from a fluid sample passing thereover; and a control unit comprising one or more processors configured to:

obtain, from the sensor assembly, a signal comprising a calibration portion and a sampling portion, the calibration portion comprising voltage measurements obtained from a calibration fluid passing over the sensor during a first time period and the sampling portion comprising voltage measurements obtained from an unknown fluid passing over the sensor during a second time period;

fit a first model to the sampling portion of the signal to identify a first time point associated with a settled voltage value determined from the first model;

fit a second model to the calibration portion of the signal to identify a calibration voltage value from the second model at the first time point;

determine a voltage difference between a voltage value of the sampling portion at the first time point and the calibration voltage value;

shift the voltage difference by a shift amount to determine a normalized voltage difference, the shift amount corresponding to a difference between the calibration voltage value and a predetermined voltage value; and calculate an ion concentration of the unknown fluid based on the normalized voltage difference.

2. The device of claim 1 wherein the ion concentration of the unknown fluid is calculated from the normalized voltage difference using a Nernst equation.

3. The device of claim 1 wherein the ion concentration of the unknown fluid is calculated from the normalized voltage difference using a modified Nernst equation adapted to model a sensitivity of the sensor assembly based on a relationship between voltage and ion concentration.

4. The device of claim 3 wherein the relationship is linear.

5. The device of claim 3 wherein the relationship is nonlinear.

6. The device of claim 3 wherein the relationship between voltage and ion concentration is learnt from a plurality of historical measurements using a regression algorithm.

7. The device of claim 6 wherein the regression algorithm is a Huber regressor.

8. The device of claim 1 wherein the one or more processors of the control unit are further configured to:

output the ion concentration of the unknown fluid.

9. The device of claim 1 wherein the first model is an exponential model.

10. The device of claim 1 wherein the second model is a linear model.

11. The device of claim 1 wherein the predetermined voltage value is greater than 0V.

12. The device of claim 11 wherein the predetermined voltage value is 5V.

13. The device of claim 1 wherein the sensor assembly comprises an electrode.

14. The device of claim 13 wherein the electrode is a polymer-based ion-selective electrode.

15. A computer-implemented method for measurement of ion concentration in fluid samples, the computer-implemented method comprising:

obtaining a waveform comprising a calibration portion and a sampling portion, the calibration portion comprising electrical potential measurements obtained from a calibration fluid passing over a sensor during a first time period and the sampling portion comprising electrical potential measurements obtained from an unknown fluid passing over the sensor during a second time period;

fitting a diffusion model to the sampling portion of the waveform to identify a first time point associated with a settled electrical potential value determined from the diffusion model;

fitting a drift model to the calibration portion of the waveform to identify a calibration electrical potential value from the drift model at the first time point;

determining an electrical potential difference between the settled electrical potential value and the calibration electrical potential value;

normalizing the electrical potential difference by shifting the electrical potential difference by an offset value thereby generating a normalized electrical potential difference, wherein the offset value corresponds to a difference between the calibration electrical potential value and a fixed electrical potential value; and calculating an ion concentration of the unknown fluid based on the normalized electrical potential difference.

16. The computer-implemented method of claim 15 further comprising:

outputting the ion concentration of the unknown fluid.

17. The computer-implemented method of claim 15 wherein the diffusion model comprises an exponential function such that the step of fitting the diffusion model comprises estimating one or more parameters of the exponential function based on the sampling portion of the waveform.

18. The computer-implemented method of claim 15 wherein the drift model comprises a linear function such that the step of fitting the drift model comprises estimating one or more parameters of the linear function based on the calibration portion of the waveform.

19. The computer-implemented method of claim 15 wherein the ion concentration of the unknown fluid is calculated from the normalized electrical potential difference using a Nernst equation.

20. A non-transitory computer readable medium storing instructions which, when executed by one or more processors of a device, cause the device to perform:

obtaining a waveform comprising a calibration portion and a sampling portion, the calibration portion comprising electrical potential measurements obtained from a calibration fluid passing over a sensor during a first time period and the sampling portion comprising electrical potential measurements obtained from an unknown fluid passing over the sensor during a second time period;

fitting a diffusion model to the sampling portion of the waveform to identify a first time point associated with a settled electrical potential value determined from the diffusion model;

fitting a drift model to the calibration portion of the waveform to identify a calibration electrical potential value from the drift model at the first time point;

determining an electrical potential difference between the settled electrical potential value and the calibration electrical potential value;

normalizing the electrical potential difference by shifting the electrical potential difference by an offset value thereby generating a normalized electrical potential difference, wherein the offset value corresponds to a difference between the calibration electrical potential value and a fixed electrical potential value; and calculating an ion concentration of the unknown fluid based on the normalized electrical potential difference.

* * * * *